United States Patent [15] 3,646,253

Wood [45] Feb. 29, 1972

[54] TINT CONTROL FOR A COLOR TELEVISION RECEIVER

[72] Inventor: Robert F. Wood, Portsmouth, Va.

[73] Assignee: General Electric Company

[22] Filed: Nov. 13, 1970

[21] Appl. No.: 89,264

[52] U.S. Cl. ........................................................178/5.4 HE
[51] Int. Cl. ...........................................................H04n 9/50
[58] Field of Search...................178/5.4 HE; 331/74; 333/29

[56] References Cited

UNITED STATES PATENTS 3,436,470 4/1969 Konkel et al. ....................178/5.4 HE

*Primary Examiner*—Robert L. Griffin
*Assistant Examiner*—John C. Martin
*Attorney*—James E. Espe, Francis H. Boos, Jr., Frank L. Neuhauser, Oscar B. Waddell and Joseph B. Forman

[57] ABSTRACT

A tint control for a color television receiver comprising means for shifting the phase of the 3.58 MHz. subcarrier reference signal before applying it to a demodulator stage. The resistive element of a potentiometer is connected across a capacitor, one end of the capacitor being connected to ground. An inductor is connected between the end of the potentiometer remote from ground and the slicer thereof, the slider being coupled to the plate of a subcarrier amplifying tube by means of a second, series-connected capacitor. Proper selection of values for the inductor and capacitors allows the use of an inexpensive linear Potentiometer, while providing the desired "-flat" response in the midrange of potentiometer adjustment.

6 Claims, 3 Drawing Figures

INVENTOR.
ROBERT F. WOOD
BY James E. Espe
HIS ATTORNEY

INVENTOR.
ROBERT F. WOOD
BY James E Espe
HIS ATTORNEY

TINT CONTROL FOR A COLOR TELEVISION RECEIVER

BACKGROUND OF THE INVENTION

The present invention relates to color television receivers and, more particularly, to means for shifting the phase of the subcarrier reference signal utilized for demodulating a chroma signal within the receiver.

In present-day American color television, color signals produced in color television cameras are combined in quadrature and the side bands transmitted as a single signal to be demodulated within a receiver through combination with a suitable subcarrier. The demodulating signal takes the form of a 3.58 MHz. subcarrier which is normally generated within the receiver by a tuned oscillator. The oscillator is kept in synchronism with the received signal by the periodic application of bursts of a 3.58 MHz. sinusoidal signal, which is abstracted from the porch of the horizontal synchronizing pulse.

While the signal thus derived normally maintains a predetermined phase relationship with the received chroma signals, disparities occasionally occur. For instance, changes in broadcasting studio transmission equipment, and variations in the characteristics of different television cameras may have undesirable effects on the relationship of the chroma signals to the burst signal. Further, variations which occur within a given television receiver make it desirable that the relative phase of the subcarrier and chroma signals be adjustable, such adjustment normally being referred to as hue or tint control.

In many color television receivers the subcarrier is applied directly to one demodulator and, after being phase-shifted by 90°, applied to a second demodulator such that chroma signals are demodulated in quadrature. The demodulating signals may thus be conceived of as a pair of phasors lying at substantially 90° to one another. As will be understood by those skilled in the art, the relationship of these phasors to the chroma signal itself determines the hues to be reproduced by the receiver. By changing the relative phase of the subcarrier with respect to the chroma signal the aforementioned phasors are caused to rotate, retaining the 90° relationship therebetween but attaining a new relationship with respect to the chroma signal. The net effect of this phase rotation is a change of the hue or tint of the image displayed. Such phase rotation is ordinarily provided by a tint control, which comprises one of the controls accessible to the viewer. Such tint controls take many forms; usually a species of reactive circuit is provided, such as a variable inductance or capacitance which selectively modifies the relative phase angle of the 3.58 MHz. subcarrier at some point in the subcarrier generation of amplification circuit.

The more straightforward phase-shifting devices which have so far been developed have detrimental effects on the Q of the oscillator circuit, are expensive, or produce an undesirably irregular or uneven response in the hues of the image displayed by the receiver, "flashing through" the proper flesh-tone adjustment. One phase-shifting device which has gained considerable popularity is the varactor, or variable-capacitance diode. Such a diode is ordinarily connected in shunt between a conductor carrying the 3.58 MHz. subcarrier, and a point of reference potential such as the ground plane. The side of the varactor remote from ground is DC biased by means of a voltage divider placed between a source of constant potential and ground. The voltage divider affords means for varying bias upon, and thus capacitance of, the diode for modifying the phase of the subcarrier. While such devices have proven satisfactory in many applications, they are often relatively expensive; further, experience has shown that it is difficult to produce varactors which have sufficiently uniform characteristics.

SUMMARY OF THE INVENTION

It is therefore an object of the present invention to provide phase-shifting means for a reference subcarrier circuit which is relatively inexpensive to construct.

It is a further object of the present invention to provide tint control means in a television receiver which produces a relatively even change in hue in response to the operation of the control.

It is a still further object of the present invention to provide a tint control network which maintains a relatively high Q throughout its range of operation.

Briefly stated, in accordance with on aspect of the present invention, the foregoing objects are achieved by providing a first capacitor connected in shunt with the resistive element of a potentiometer, one end of the resulting parallel combination being connected to a point of reference potential, advantageously the ground plane. The slider of the potentiometer is then coupled to a conductor carrying a subcarrier signal by means of a second capacitor. The network so far described, while providing the necessary phase shift, produces an undesirable response in that the hues "jump" through the critical flesh-tone portion of the color spectrum. In order to flatten the resistive characteristic of the circuit over the middle range of its adjustment in order to effect a lessened sensitivity in the critical range, an inductance is placed in shunt between the slider of the potentiometer and that side of the capacitor remote from ground. The flattened response characteristic of the resulting network makes it possible to utilize an inexpensive linear potentiometer, providing the desired response along with the advantages manifest in the use of economical components.

BRIEF DESCRIPTION OF THE DRAWINGS

While the specification concludes with claims particularly pointing out and distinctly claiming the subject matter which is regarded as the invention, it is believed that the invention will be better understood from the following description of the preferred embodiment taken in conjunction with the accompanying drawings in which:

DESCRIPTION OF THE PREFERRED EMBODIMENT

Figure 1:
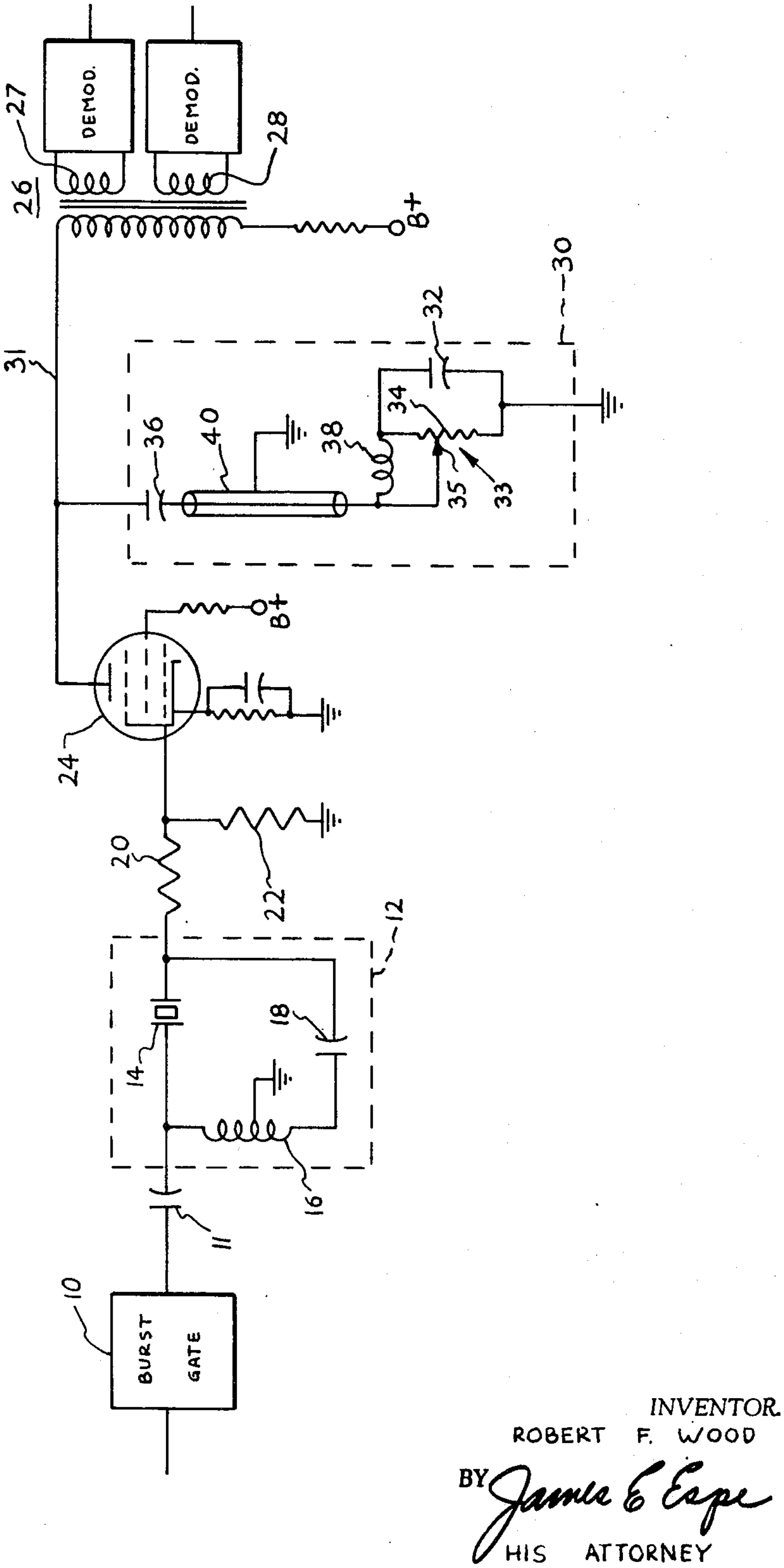
FIG. 1 is a schematic diagram showing the inventive tint control network.

Referring now to FIG. 1, selected portions of a color television receiver are shown, including a burst gate 10 which serves to abstract bursts of 3.58 MHz. sinusoidal signal from the received signal. The received bursts are applied through a coupling capacitor 11 to a reference oscillator 12 including piezoelectric crystal 14, inductor 16 and capacitor 18 which form a resonant circuit for producing a continuous 3.58 MHz. subcarrier. Resistor 20 serves to lower the Q of the oscillator so that the oscillator is not unduly selective. Resistor 22 is placed between the subcarrier path and ground to serve as a grid return resistor. The subcarrier signal is then applied to the control grid of subcarrier amplifier 24, shown here as a pentode. The amplified subcarrier signal is transmitted from the amplifier to a transformer generally indicated at 26 and having a pair of secondary windings 27 and 28. Each winding serves to apply a subcarrier signal having a predetermined phase relationship to the subcarrier derived from the amplifier to one of a pair of demodulators.

In order to effect control over the hue or tint of the displayed image, phase-shifting means 30 are provided. While the phase-shifting means, hereinafter referred to as a tint control network as illustrated is connected between a conductor 31 carrying the now-amplified subcarrier and ground, it will be understood that the network may alternatively be connected to other points in the subcarrier transmission path.

A first capacitor 32 is connected in shunt with the resistive leg 34 of a potentiometer 33, one end of the resulting combination being connected to ground. The slider 35 of the potentiometer is coupled by means of a second capacitor 36 to the subcarrier path. An inductor 38 is connected between the slider 35 of the potentiometer and that intersection of the resistive leg of the potentiometer and the capacitor which is remote from ground. Shielded cable 40 connects slider 35 and capacitor 36. The shielded cable prevents the 3.58 MHz. signal from interfering with other nearby receivers and, moreover, supplies a small capacitance between slider 35 and ground. Such additional capacitance, while not necessary to the satisfactory functioning of the network, enhances its operation slightly.

As will be understood by those skilled in the art, it is necessary to locate the tint control adjustment in a position where it is readily accessible to the viewer. This requirement, however, is often incompatable with the need for placing the subcarrier amplifier and associated circuitry at specific points within the receiver chassis. For this reason, an extended length of conductor is required to connect the network to the subcarrier conductor. In order to avoid unwanted interference with other circuits and components of the receiver, shielded cable 40 is utilized for that portion of the conductor extending from the general area of the subcarrier amplifier to the control area of the receiver. It will be seen that with the present tint control network, it is unnecessary to extend the subcarrier path out to a control panel, and then back to the demodulator area as would be the case when a tint control network is interposed in series with the subcarrier path. Such a series-connected network would further necessitate a length of shielded conductor double that with the present tint control, increasing the expense of the network.

Figure 2:
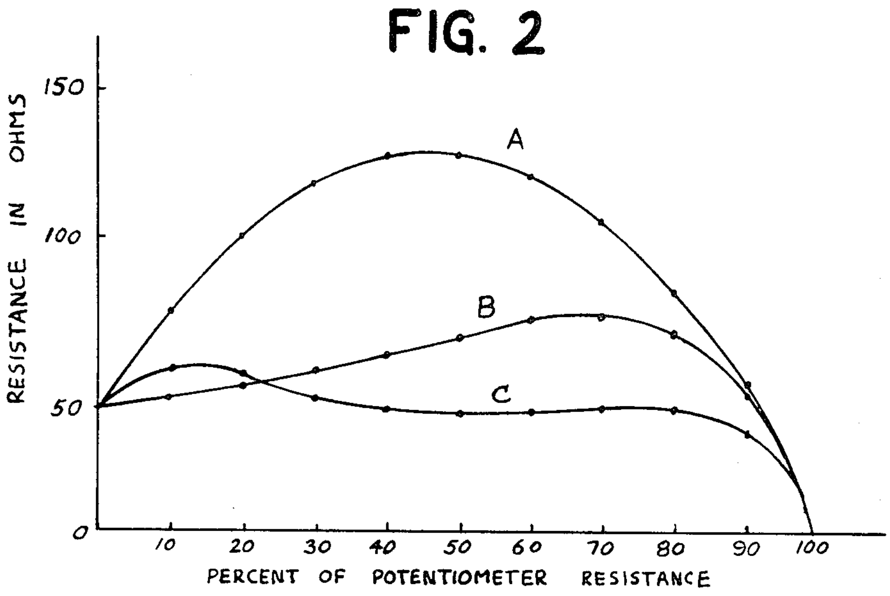
FIG. 2 is a graphical representation of the AC resistance of the inventive network as a function of potentiometer adjustment.

Turning now to FIG. 2, the AC resistance of the tint control network as a function of potentiometer resistance is shown. Curve A represents the response afforded by the network when inductance 38 is open-circuited or nonexistent, while curve B indicates the response when inductance 38 is short circuited. Curve C represents the optimum condition, when an inductance 38 of a suitable value is placed between slider 35 and one end of resistive element 34, it being apparent from the Figure that the series resistance presented by the network remains relatively constant over most of the range of potentiometer adjustment. This resistive characteristic provides the network with a relatively constant Q and further insures constant loading of amplifier 24.

Figure 3:
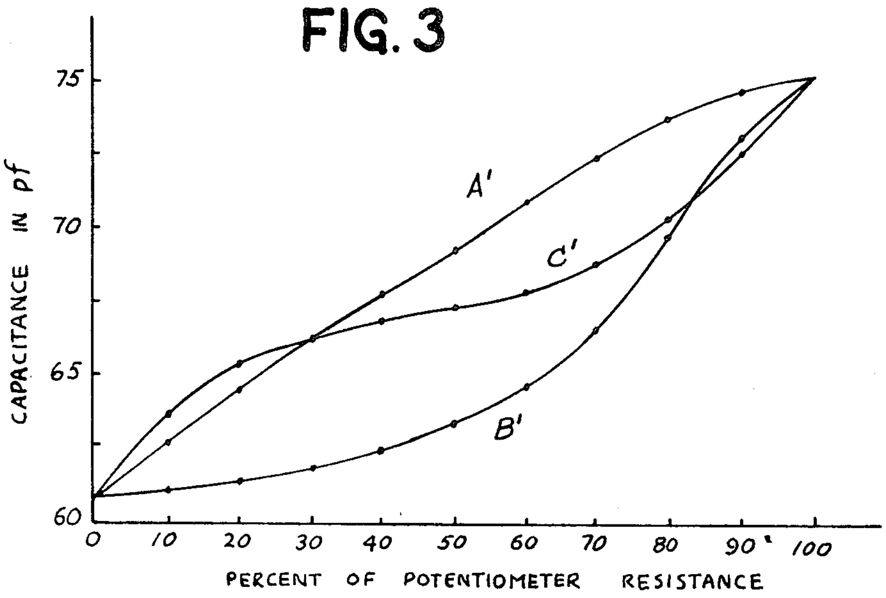
FIG. 3 is a graphical representation of the capacitance afforded by the inventive network as a function of potentiometer adjustment.

FIG. 3 illustrates how the capacitance of the network varies as the value of potentiometer 33 is changed, demonstrating the important contribution provided by inductor 38. Curve A′ represents the capacitance of the network as a function of potentiometer adjustment when inductor 38 is open-circuit or nonexistent, while B′ illustrates the capacitance when inductor 38 is short circuited. In both cases it will be seen that the capacitance of the network changes in a relatively linear fashion. The net effect of moving the slider of the potentiometer with a substantially constant velocity is then to cause the adjustment to pass through the critical midrange of the curve, where image hue is most sensitive to subcarrier phase, as rapidly as though the range in which hue response is much less pronounced. Curve C′ illustrates the response of the network when an inductor of a suitable value is provided between the slider and the nongrounded end of the potentiometer. The inductor gives a "bandspread" effect to the center of the control range, at the same time reducing the effective series resistance presented by the network to the signal path. The change in network in capacitance afforded by movements of the potentiometer slider in the central range of potentiometer values is now drastically lessened, facilitating the proper adjustment of the receiver for that range of phase angles wherein displayed hues change most rapidly with phase angle.

Returning now to FIG. 1, the operation of the inventive network will be explained in more detail. Only AC signals are presented to the network by virtue of the presence of blocking capacitor 36. The capacitance afforded by shielded cable 40 constitutes a distributed capacitance which may be regarded as the equivalent of a capacitor lying between the slider of the potentiometer and ground. The tint control network may thus be thought to comprise a first capacitor 32 in series with inductor 38 and a second capacitor 36, with resistance 34 connected in shunt about capacitor 32. The resistance of potentiometer 33 acts as a variable voltage divider with its tap connected in shunt with inductor 38. When the slider 35 of the potentiometer is at its uppermost position, inductor 38 is effectively shunted out, and an impedance comprised of capacitor 36 and the parallel combination of resistance 34 and capacitance 32 is presented to the line carrying the subcarrier signal. In the illustrated embodiment the capacitance provided by shielded cable 40 may now be considered to lie in parallel with resistance 34 and capacitance 32.

At the other extreme, when the slider 35 of the potentiometer is at its lowermost position, the lower part of the network is practically disabled since the slider now shunts inductor 38, capacitor 32 and resistance 34. In this position, only capacitor 36 is available to affect the phase of the subcarrier. Between these extremes, the contributions of the various circuit elements vary, depending upon the position of slider 35. The presence of inductor 38 serves to lower the capacitance of the tint control network slightly by providing a reactive path about the potentiometer to one plate of capacitor 32. The characteristics of the inductor are such, however, that sufficient impedance is presented to mitigate the rapid dominance of capacitor 32 as slider 35 traverses the central range of resistive element 34. The value of inductor 38 may advantageously be chosen to effect a resonant condition in the network when the resistive value of potentiometer 33 is in its central range.

It will be apparent that the response of the circuit as a function of slider position could be further modified by means of a potentiometer incorporating a specially tailored, nonlinear resistance; however, the relatively even Q of the present circuit would be sacrificed to some degree. The presence of inductor 38 provides the desired response characteristic without the need for a potentiometer having an expensive, specially designed nonlinear resistive element.

As will be evident from the foregoing description, certain aspects of the invention are not limited to the particular details of construction of the examples illustrated, and it is contemplated that other modifications and applications will occur to those skilled in the art. It is therefore intended that the appended claims shall cover such modifications and applications as do not depart from the spirit and scope of the invention.

What is claimed as new and desired to be secured by Letters Patent of the United States is:

1. In a color television receiver including demodulator means, means for providing a reference signal, means for amplifying the reference signal, and conductor means for transmitting the reference signal, means for modifying the phase of the reference signal comprising:

first capacitor means;

resistor means having a first and a second end and having movable contact means associated therewith for selectively engaging said resistor means at preselected points along its length;

said resistor means being connected in shunt with said first capacitor means, said second end of said resistor means further being connected to a point of reference potential;

inductor means connected between said first end of said resistor means and said movable contact means; and second capacitor means adapted to be coupled between said movable contact means and the conductor means.

2. The invention as defined in claim 1, further including third capacitor means coupled between said movable contact means and a point of said reference potential.

3. The invention as defined in claim 2, wherein said third capacitor means comprises shielded cable means extending from said movable contact means to said second capacitor means, the shielding element of said shielded cable means being connected to a point of said reference potential.

4. The invention as defined in claim 1, wherein said adjustable resistor means and said movable contact means comprise a potentiometer.

5. The invention as defined in claim 1, wherein said point of reference potential is the ground plane.

6. The invention as defined in claim 1, wherein the resistance between said movable contact means and said first end of said resistive means varies linearly with the position of said movable contact means.

* * * * *